Patented Feb. 3, 1931

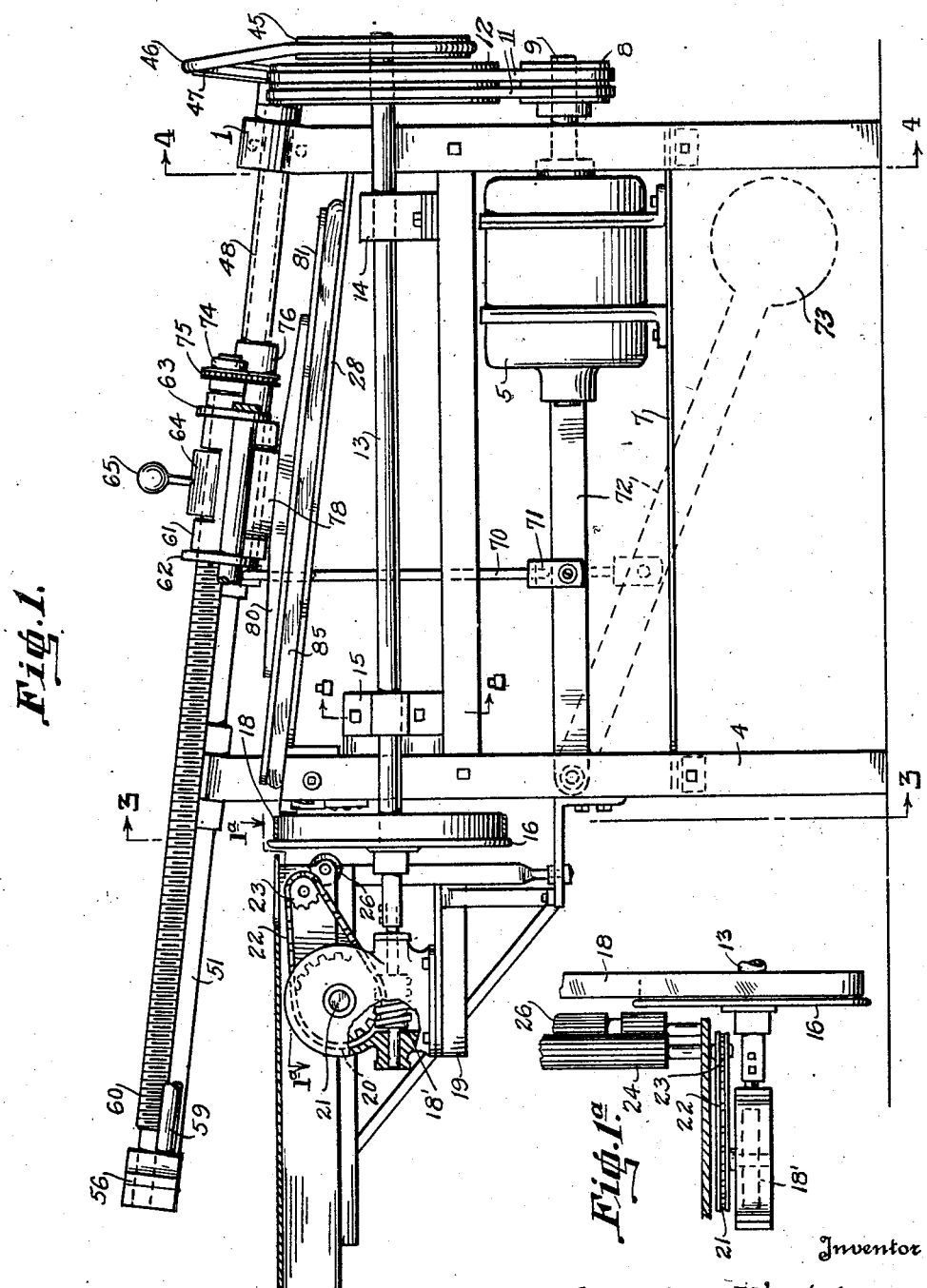

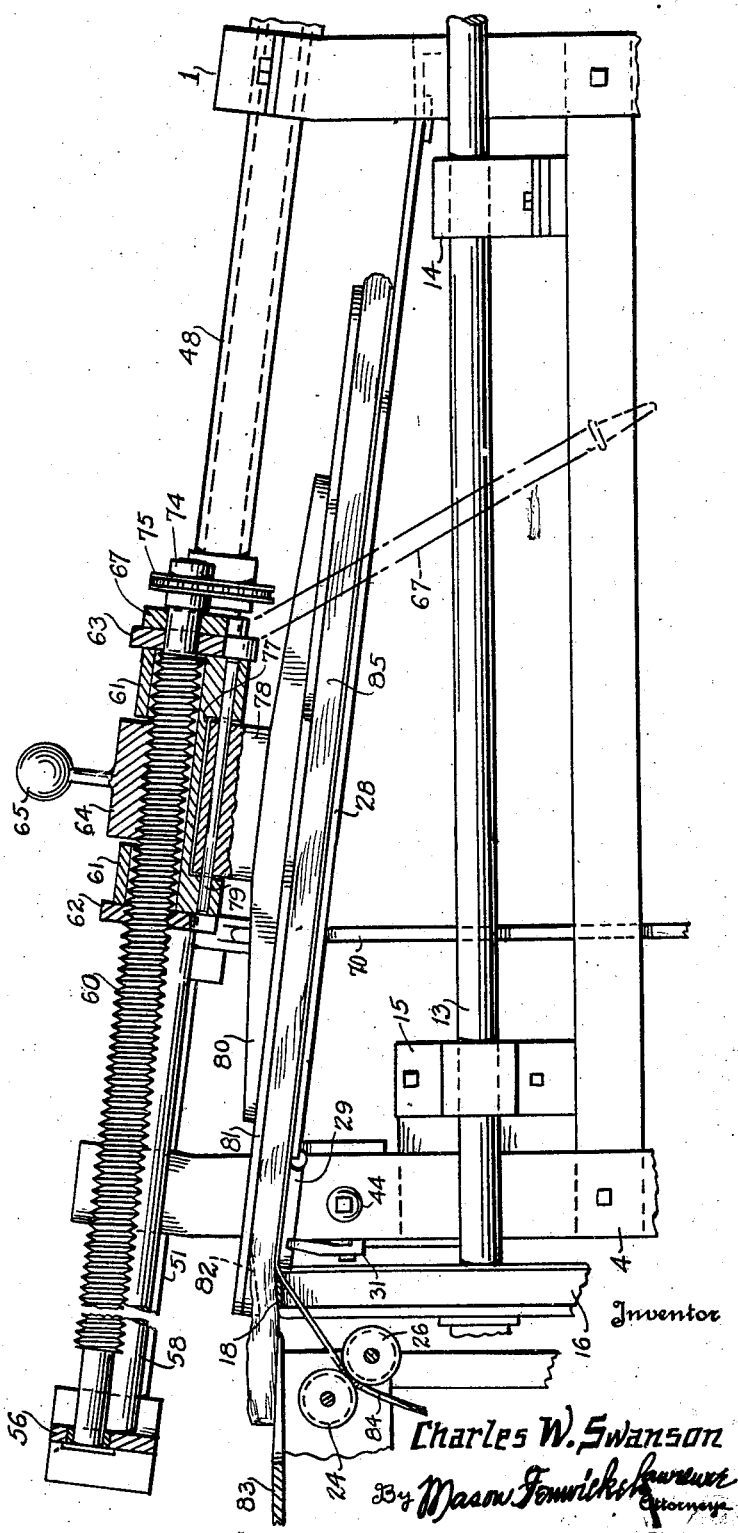

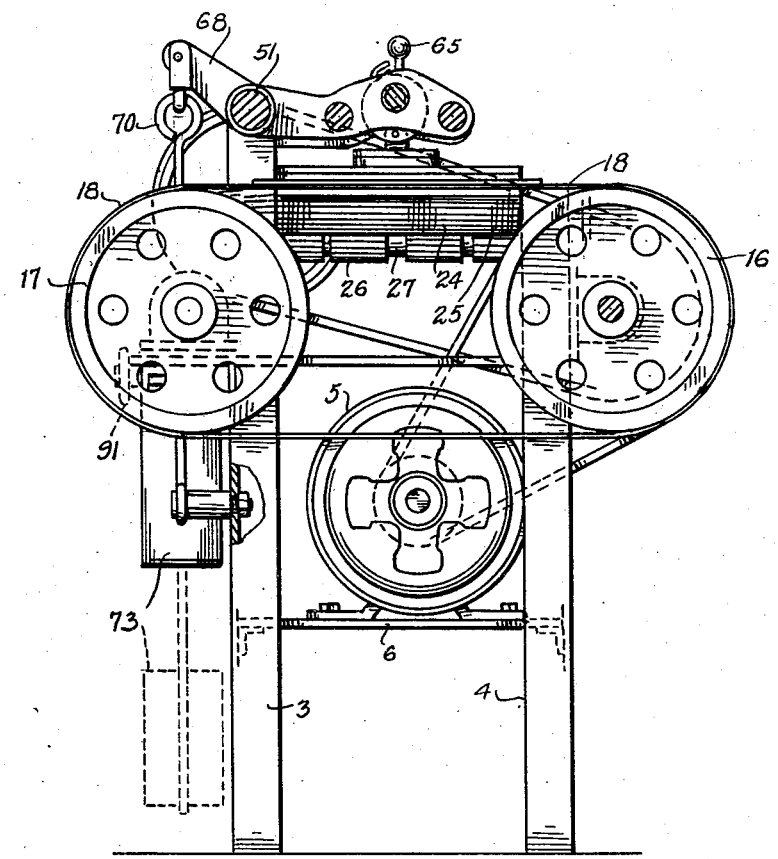
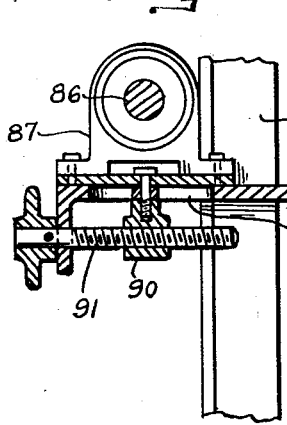
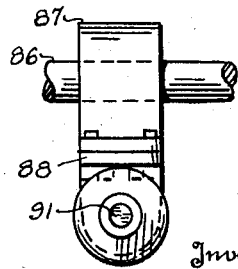

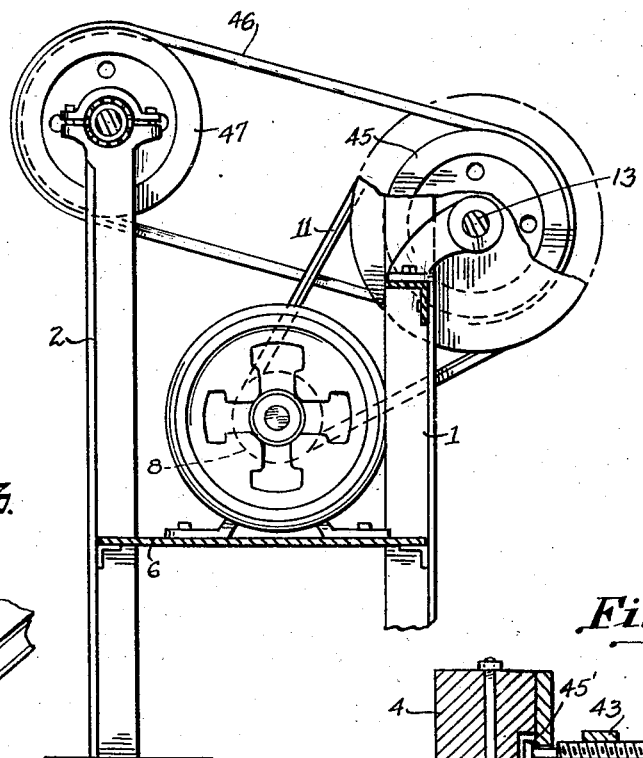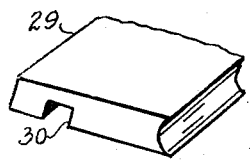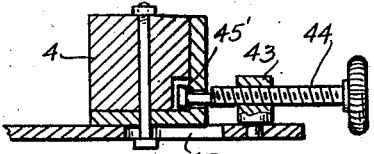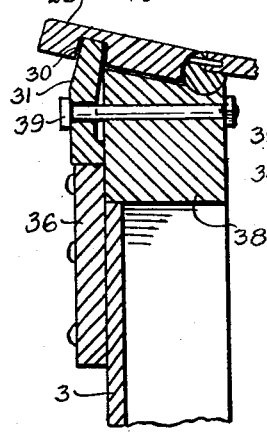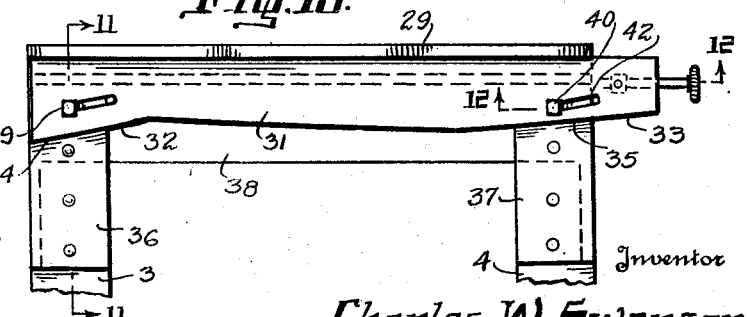

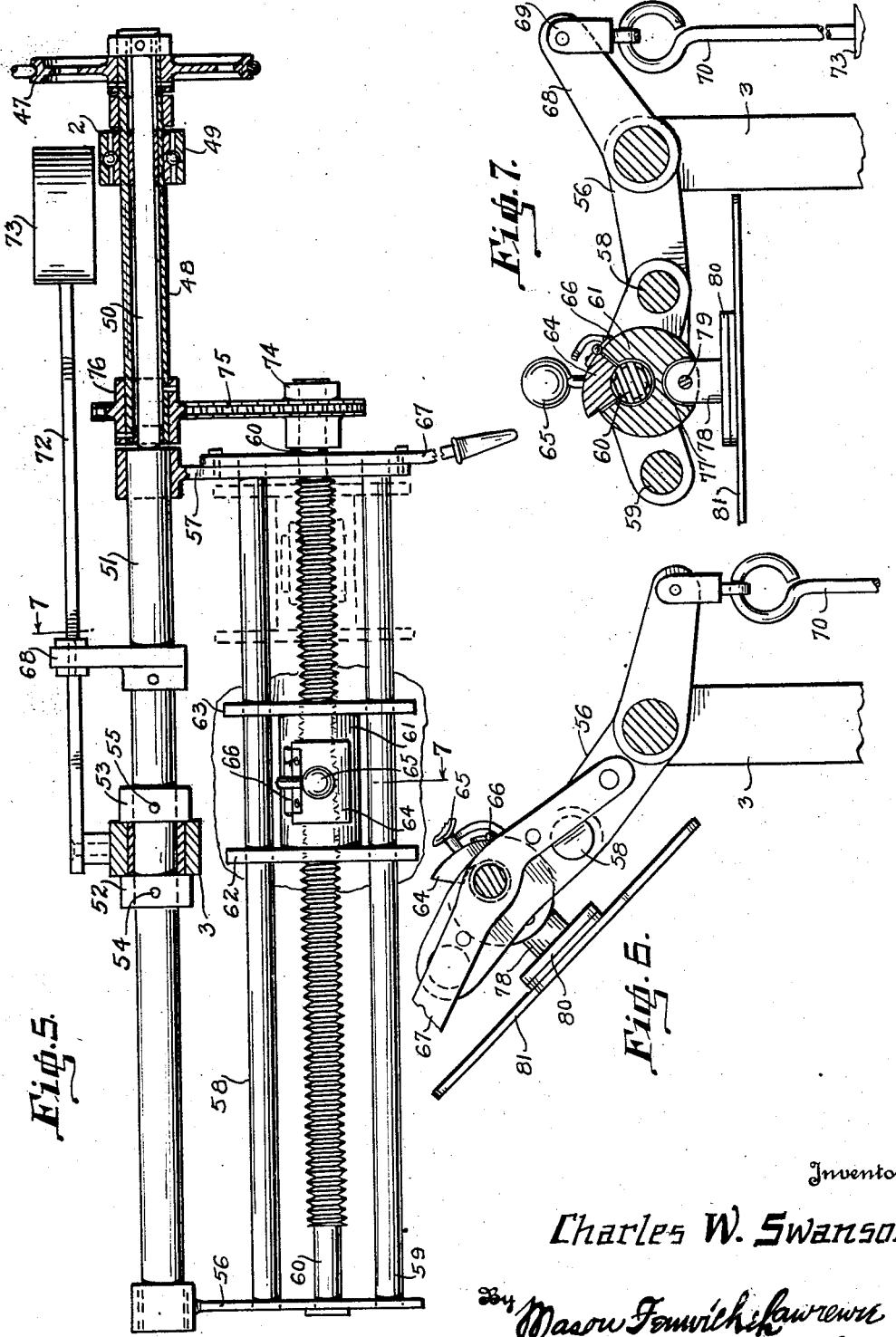

1,791,067

UNITED STATES PATENT OFFICE

CHARLES W. SWANSON, OF OTTUMWA, IOWA, ASSIGNOR TO JOHN MORRELL & COMPANY, OF OTTUMWA, IOWA

BACON-SKINNING MACHINE

Application filed September 23, 1929. Serial No. 394,665.

This invention relates to bacon skinning machine, and is intended as an improvement on the bacon skinning machine disclosed in U. S. Patent No. 1,590,708.

The main object of the invention is to provide a machine of the character described, in which the process of separating the skin from a slab of bacon is materially speeded up, and in which the separation is, for the most part, effected automatically while the feeding elements of the machine are being reset in position for operation on another slab of bacon.

Another object of the invention is to provide a machine of this character in which the end of the bacon supporting table is made adjustable to vary the height of the part thereof immediately adjacent to the skinning band knife.

Other objects of the invention will become apparent as the detailed description thereof proceeds.

In the drawings:

Figure 1 is a side elevation of the bacon skinning machine having parts thereof broken away for clearness of illustration;

Figure 1a is a fragmentary plan of parts of the machine adapted to grip the bacon skin or rind to effect automatic separation of the rind from the meat thereof;

Figure 2 is a side elevation to, an enlarged scale, of mechanism for feeding a slab of bacon to the skinning knife before the skin has been engaged by gripping rollers to effect automatic separation of the skin from the slab;

Figure 3 is a vertical transverse section taken on the line 3—3 of Figure 1;

Figure 4 is a vertical transverse section on the line 4—4 of Figure 1;

Figure 5 is a plan view, to an enlarged scale, of the feeding mechanism illustrated on a similar scale in Figure 2;

Figure 6 is a fragmentary sectional elevation taken on the line 7—7 of Figure 5;

Figure 7 is a vertical transverse section taken on the line 7—7 of Figure 2;

Figure 8 is a side elevation of tension adjusting mechanism for the band knife forming part of this invention, the adjusting mechanism being shown partly in section;

Figure 9 is a fragmentary end elevation of the adjusting mechanism shown in Figure 8;

Figure 10 is a fragmentary side elevation of mechanism for adjusting the height of the bacon supporting table near the band knife;

Figure 11 is a vertical transverse section taken on the line 11—11 of Figure 10;

Figure 12 is a horizontal cross-section taken on the line 12—12 of Figure 10; and Figure 13 is a fragmentary perspective of the adjustable part of the bacon supporting table.

Referring to the drawings, the machine comprises a supporting frame having standards, 1, 2, 3 and 4, (see Figures 1, 3 and 4), connected by suitable rails and bracing members. A motor 5, suitably secured to a cross brace 6 and the longitudinal brace 7 (see Figures 3 and 1, respectively), has a double-grooved pulley 8 suitably secured to the end of its rotor shaft 9.

A pair of belts 11 transmits the rotation of the pulley 8 to the large double-grooved pulley 12, which is fixed to the end of a shaft 13, suitably journaled in bearings 14 and 15 secured to the standards 1 and 4, respectively. The shaft 13 has fixed thereto, the flanged pulley 16 (see Figure 3), which operates with a similar pulley 17 to support and rotate the band knife 18.

The shaft 13 extends through the pulley 16 and has the projecting end connected to a reducer 18' (see Figure 1), which is suitably supported on a bracket 19 forming part of the supporting frame-work of the machine. A sprocket gear 20 is fixed to the rotor shaft 21 of the reducing gear and has a sprocket chain 22 extending around it and around the sprocket pinion 23, fixed to the end of a feed roller 24 which forms one of the elements for gripping the skin of a slab of bacon in order to pull the slab automatically across the band knife 18.

The roller 24 (see Figure 3) is a cylinder having grooves 25 extending throughout the length thereof, and is the driving roller for drawing the slab of bacon across the band knife 18. A second corrugated roller 26 is suitably journaled in the framework of the machine and is also grooved or corrugated in order to cooperate with the roller 24 in pulling the bacon skin from the slab of bacon. Preferably the roller 26 is provided with a plurality of annular grooves 27, which form interruptions in the periphery of the roller 26 and facilitates the gripping of the bacon skin between the rollers.

A table 28 (see Figures 1 and 2) is fixed to the upper end of the framework in a slightly inclined position. The higher end of the table 28 is provided with a part 29, which is suitably pivoted to the end of the table 28, and has the free end thereof adjustable to vary the height of the end thereof adjacent to the band knife 18. The purpose of this adjustment is to enable the operator to adjust the extreme upper edge of the table to compensate for different thicknesses of skin to be removed from the slabs of bacon.

The adjustment of the free end of the part 29 is effected by the structure shown in Figures 10, 11, 12 and 13. The part 29 is provided with a groove 30, in which slides the upper edge of an adjusting plate 31, having the lower edge thereof cut to form inclined edges 32 and 33 cooperating with correspondingly inclined edges 34 and 35, respectively, of supporting plates 36 and 37 secured to the standards 3 and 4.

A cross rail 38 connects the upper end of the standards 3 and 4, and bolts 39 and 40 extend through this cross rail and through slots 41 and 42 formed in the adjusting plate 31. The slots 41 and 42 are parallel to the inclined edges 32 and 33 of the adjusting plate 31, and thereby permit these edges to remain in supported contact with the edges 34 and 35 of the plates 36 and 37 throughout all adjustment of the plate 31.

The plate 31 projects beyond the standard 4 and has a nut 43 swiveled to the back thereof. An adjusting screw 44 is screwthreaded into this nut and has its end swiveled into a plate 45, suitably secured to the standard 4.

It will be obvious from inspection of Figures 10 and 11, that when the adjusting plate is moved lengthwise by the screw 44, its inclined edges will cause the part 29 to rise or fall as desired. It will be obvious that the raising or lowering of this part 29 will raise or lower the slab of bacon relative to the band knife 18.

The shaft 13 projects through the pulley 12 and has a second pulley 45 secured thereto (see Figures 1 and 4). The pulley 45 has a semi-circular groove formed therein and adapted to receive a circular belt 46, which extends around a second pulley 47 similar to the pulley 45, for the purpose of imparting rectilinear movement to a plate for pushing a slab of bacon along the table 28.

The pulley 47 (see Figure 5) is secured to a sleeve 48 which is journaled in a ball bearing 49 at the upper end of the standard 2. The sleeve 48 is rotatably mounted on the reduced portion 50 of a shaft 51 which is journaled in the upper end of the standard 3. Positioning collars 52 and 53 are suitably secured by set screws 54 and 55, respectively, to the shaft 51 on opposite sides of the standard 3, in order to prevent the shaft 51 from moving longitudinally in its bearings.

A pair of brackets 56 and 57 are secured to the shaft 51; and guide rails 58 and 59 extend parallel to each other between said brackets. A long screw 60 is rotatably mounted in the brackets 56 and 57 and extends between said brackets parallel to each of the guide rails 58 and 59. A carriage 61 is mounted to slide on the guide rails 58 and 59 by means of the arms 62 and 63, slidably mounted on the rails 58 and 59.

The carriage 61 slides freely over the screw-threaded part of the screw 60; and is provided with a segmental nut 64, having screw-threads thereon adapted to mesh with the corresponding screwthreads of the screw 60. The nut 64 is provided with a weighted handle 65, adapted to hold the nut 64 in engagement with the screw 60 in certain positions of the shaft 51 and the elements carried thereby. The nut 64 is connected to the carriage 61 by a hinge 66, and is adapted to swing out of engagement with the screw 60 when the brackets 56 and 57 are swung away from the table 28.

A handle 67 is bolted to the bracket 57 in order that the brackets 56 and 57 may be swung manually about the axis of the shaft 51 away from the table 28 when desired. In order to counterbalance the mechanism carried by the brackets 56 and 57, an arm 68 is suitably fixed to the shaft 51. The outer end of the arm 68 has a bifurcated link 69 fixed thereto, and a rod 70 pivoted at its upper end to the link 69 has its lower end secured to bifurcated member 71, which straddles and is pivoted to a lever arm 72. The lever arm 72 has one end thereof pivoted to the standard 3, and at its other end is provided with a counterbalancing weight 73. The counterbalancing mechanism is designed to hold all the parts carried by the brackets 56 and 57 normally in elevated position relative to the table 28, and as shown in Figure 6.

One end of the screw 60 projects through the bracket 57 and has secured thereto the sprocket wheel 74, which meshes with a sprocket chain 75, extending over and meshing with a second sprocket wheel 76 fixedly secured to the sleeve 48. It will be obvious from inspection of Figure 5 that rotation of the sleeve 48 by the pulley 47 will cause rotation of the screw 60 through the interposed sprocket mechanism. It will also be obvious that the mechanism carried by the brackets 56 and 57 may be swung about the axis of the shaft 50 without disengaging the sprocket wheels 74 and 76 from their operating chain 75.

The carriage 61 has a recess 77 (see Figure 2) formed in its lower part; and a bracket 78 is pivotally secured in this recess by means of a pin 79. This recess is made sufficiently large to permit a limited rotary movement of the bracket 78 to which is secured a brace member 80 of a pusher plate 81. The pusher plate 81 has a wedge-shaped member 82 secured to the upper end thereof, and adapted to engage the fleshy part of a slab of bacon in order to push it lengthwise of the table 28.

A second table 83 is supported rearwardly of the band knife 18 to receive the bacon from which the skin 84 of the slab of bacon 85 has been removed by the corrugated rollers 24 and 26.

In operation: The machine is assumed to be running with the pusher plate 81 normally raised from the table 28. A slab of bacon is placed on the table with skin down. The pusher plate 81 is pulled down to engagement with the slab of bacon by means of a handle 67. This operation causes the member 82 to dig into the fleshy part of the slab 85 and move it along the table 28 until the knife 18 begins its cutting operation on the slab and separates the skin 84 therefrom. As the slab 85 is fed along the table 28 the skin 84 moves under the knife 18, and is caught between the corrugated rollers 24 and 26.

As soon as the rollers 24 and 26 grip the skin 84 between them, the separation of the skin from the slab is automatically effected by the pull of the rollers on the said skin. It is then no longer necessary for the operator to hold the pusher plate 81 in pushing contact with the slab of bacon 85. As soon as the operator releases the handle 67, the counterweight 73 rotates the shaft 51 along with the brackets 56 and 57 and mechanism carried thereby into the raised position shown in Figure 6. The weighted handle 65 then automatically raises the segmental nut 64 from meshing engagement with the screw 60, and permits the carriage 61 to slide, by gravity, along with the arms 62 and 63 on the guide rods 58 and 59 to the starting position adjacent the sprocket wheel 74.

The whole operation is a speeding up, because the automatic separation of the skin from the slab leaves the operator free to position another slab on the table 28 immediately behind the one being skinned, and gives him sufficient time to remove a skinned slab from the machine.

While I have described a specific embodiment of my invention, it must be understood that I do not limit myself to any particular construction for performing the same function except as imposed by the wording of the appended claims.

What I claim is:

1. In a bacon skinning machine, a supporting frame having an inclined top thereon, a band knife movable across said top adjacent the upper edge thereof, means for moving the slab of bacon along said top into operable contact with said knife, means for gripping the skin separated from said slab by said knife and for pulling the slab along said top independently of said moving means, and means for automatically releasing said moving means from the slab of bacon and returning said moving means to starting position.

2. A bacon skinninig machine comprising a support having an inclined top thereon, a band knife movable across said top adjacent the upper edge thereof, manually controlled means for moving a slab of bacon into operative contact with said knife, counterbalancing means for normally holding said moving means out of contact with a slab on said top, and means for gripping the skin separated from said slab by said knife to move the slab over said knife independently of the moving means.

3. A bacon skinning machine having an inclined table, a band knife movable across said table adjacent the upper edge thereof, manually controlled means for moving a slab of bacon into operative contact with said knife, counterbalancing mechanism normally holding said moving means out of contact with a slab on said table, means for gripping the skin separated from said slab by said knife to move the slab over said knife independently of the moving means, said moving means being constructed to assume a predetermined position in the machine when not manually controlled.

4. In a bacon skinning machine, a supporting frame having an inclined table thereon, a band knife movable horizontally past the upper edge of said table, means including a horizontal shaft for moving said band knife, a second shaft parallel to said inclined table, means for rotating the second shaft from the first named shaft, a pusher plate slidably connected to the second shaft, and means connected to the second shaft for moving the pusher plate in one direction only over said table.

5. In a bacon skinning machine, a supporting frame having an inclined table thereon, a shaft rotatably mounted in said frame parallel to said table, a pair of brackets fixed to said shaft and extending substantially parallel to each other and radially from said shaft, slide rods connected to said brackets parallel to said shaft, a carriage slidable on said rods and having a pusher plate depending therefrom, and means for sliding said carriage in one direction only on said slide rods.

6. In a bacon skinning machine, a supporting frame having an inclined table thereon, a shaft rotatably mounted in said frame parallel to said table, a pusher plate, means for supporting said plate to rotate with said shaft and to slide parallel thereto, and means rotatably mounted on said shaft for sliding said supporting means in one direction only over said table.

7. In a bacon skinning machine, a supporting frame having an inclined table thereon, a shaft rotatably mounted in said frame parallel to said table, a pusher plate, means mounted to rotate with said shaft for supporting said plate to rotate with said shaft and to slide parallel thereto, a screw rotatably mounted in said means parallel to said shaft, means rotatably mounted on said shaft to rotate said screw, a segmental nut hinged to said supporting means and adapted to engage said screw to slide said supporting means over said table, and means for disengaging said nut from said screw when the supporting means is rotated about the axis of said shaft away from said table.

8. In a bacon skinning machine, a support having an inclined table thereon, a shaft rotatably mounted in said support parallel to said table, a pusher plate, means connecting said pusher plate to said shaft and including a screw, and means adapted to engage said screw only when the pusher plate occupies a predetermined position over said table to move said pusher plate in one direction only relative to said table.

9. In a bacon skinning machine, a support having an inclined table thereon, a band knife movable rectilinearly past the upper edge of said table, the upper part of said table being pivoted relative to the remaining part, means for adjusting the edge of said upper part relative to said knife, gripping rollers below said knife and on the side thereof opposite the said table, a pusher plate movable over said table, and means for rotating said gripping rollers and moving said knife and pusher plate relative to said table.

10. In a bacon skinning machine, a support having an inclined table thereon, a band knife movable rectilinearly past the upper edge of said table, the upper part of said table being pivoted relative to the remaining part, means for adjusting the edge of said upper part relative to said knife, gripping rollers below said knife and on the side thereof opposite the said table, a substantially horizontal shaft in said support for rotating said gripping rollers and moving said knife, a second shaft parallel to the inclined table, a pusher plate connected to said second shaft to slide parallel thereto over said table, and means rotatably mounted on the second shaft and driven by the first named shaft for sliding said pusher plate over said table.

11. In a bacon skinning machine, a support having an inclined table thereon, a shaft journaled in said support, a pusher plate, a guide frame fixed to said shaft for slidingly supporting said pusher plate, a sleeve rotatably mounted on said shaft, means connecting said sleeve to said pusher plate for moving said pusher plate on said guide frame over said inclined table, and means for normally holding said frame in a predetermined inoperative position relative to said table.

12. In a bacon skinning machine, a support having an inclined table thereon, a shaft journaled in said support, a pusher plate, a guide frame fixed to said shaft for slidingly supporting said pusher plate, a sleeve rotatably mounted on said shaft, means connecting said sleeve to said pusher plate for moving said pusher plate on said guide frame over said inclined table and including a gravity controlled member, and means for normally holding said frame in a predetermined inoperative position relative to said table and with the pusher plate in a predetermined position in said frame.

13. A bacon skinning machine including a support having an inclined table thereon, a band knife movable transversely of said support adjacent the upper edge of said table, means for adjusting the upper edge of said table relative to said band knife, gripping rollers below said band knife and on the side thereof opposite to the upper edge of said table, a pusher plate, and means for supporting and moving said pusher plate over said table toward said band knife.

14. In a bacon skinning machine, a feed table; skin severing means; pusher means adapted to engage and move a slab of bacon along the table against the skin severing means; and a counterbalance normally swinging the pusher means away from the table.

15. In a bacon skinning machine, skin severing means; and pusher means adapted to move a slab of bacon against the skin severing means to return automatically to starting position after a pusher operation.

16. In a bacon skinning machine, pusher means adapted to move a slab of bacon against skin severing means; and an inclined support for the pusher means, up which it is propelled during a skinning operation and down which it returns by gravity after such operation.

17. A bacon skinning machine, skin severing means, a pusher member adapted to be manually moved from a predetermined inoperative position into contact with a slab of bacon to move the latter against the skin severing means, said pusher member being arranged to gravitate to starting position when in inoperative position and mechanical means for propelling the pusher member automatically when the pusher member is manually applied.

18. In a bacon skinning machine, a table, a pusher member mounted above said table and adapted to be manually moved from an inoperative position toward an operative position adjacent a table, a counterbalance for lifting the pusher member when not in operative position and a propelling screw, said member including a threaded segment for engaging the screw to propel the pusher member, said segment being pivoted to said members so as to drop out of engagement with the screw when the pusher member is lifted by the counterbalance.

19. In a bacon skinning machine, skin severing means, pusher means adapted to move a slab of bacon against the skin severing means, and an inclined support for the pusher means, up which it is propelled during operation and down which it returns by gravity after operation, in combination with a skin holding and pulling means, adapted to complete a skinning operation during the return of the pusher means to starting position.

In testimony whereof I affix my signature.

CHARLES W. SWANSON.